United States Patent
Klein

(10) Patent No.: US 8,584,831 B2
(45) Date of Patent: Nov. 19, 2013

(54) TRANSFER CONVEYOR FOR TRANSPORTING STANDARDIZED LOADING UNITS

(75) Inventor: Matthias Klein, Hanau (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 13/255,955

(22) PCT Filed: Feb. 18, 2010

(86) PCT No.: PCT/EP2010/052060
§ 371 (c)(1),
(2), (4) Date: Sep. 12, 2011

(87) PCT Pub. No.: WO2010/102890
PCT Pub. Date: Sep. 16, 2010

(65) Prior Publication Data
US 2012/0000750 A1   Jan. 5, 2012

(30) Foreign Application Priority Data
Mar. 10, 2009  (DE) .................. 10 2009 012 037

(51) Int. Cl.
*B65G 13/075* (2006.01)

(52) U.S. Cl.
CPC .................. *B65G 13/075* (2013.01)
USPC ................. 198/592; 198/861.5; 198/780

(58) Field of Classification Search
USPC .............. 198/592, 861.5, 780–791; 193/35 R
See application file for complete search history.

(56) References Cited

U.S. PATENT DOCUMENTS

| | | | | |
|---|---|---|---|---|
| 480,200 A | * | 8/1892 | Madock | 198/592 |
| 1,045,873 A | * | 12/1912 | Neave | 198/586 |
| 1,767,574 A | * | 6/1930 | Buccicone | 198/371.3 |
| 3,080,043 A | * | 3/1963 | Johansen et al. | 198/435 |
| 4,441,607 A | * | 4/1984 | Bowman et al. | 198/781.06 |
| 4,977,999 A | * | 12/1990 | Smock | 198/463.3 |
| 5,806,661 A | * | 9/1998 | Martin et al. | 198/781.06 |
| 5,823,319 A | * | 10/1998 | Resnick et al. | 198/781.06 |
| 6,152,286 A | * | 11/2000 | Pienta | 198/459.6 |
| 7,721,870 B2 | * | 5/2010 | Henze | 198/346 |

FOREIGN PATENT DOCUMENTS

| | | | |
|---|---|---|---|
| DE | 1 059 835 | | 6/1959 |
| DE | 1059835 B | | 6/1959 |
| DE | 69 43 392 U | | 2/1970 |
| DE | 6943392 U | | 2/1970 |
| FR | 2564809 A1 | * | 11/1985 |
| FR | 2591205 A | * | 6/1987 |
| GB | 286190 | | 3/1928 |
| JP | 57131609 A | | 8/1982 |
| JP | 59172312 A | | 9/1984 |

* cited by examiner

*Primary Examiner* — Mark A Deuble
(74) *Attorney, Agent, or Firm* — Laurence A. Greenberg; Werner H. Stemer; Ralph E. Locher

(57) ABSTRACT

A transfer conveyor transports standardized unit loads, such as freight containers, pallets or the like, from a first height level to a second height level, in particular from a higher storage location to a lower transport device. The transfer conveyor is part of a rocker having an adjustable inclination around a pivot axis from one position in which one end of the rocker is aligned with one height level to another position in which the other end of the rocker is aligned with the other height level. Effectiveness and cost-efficiency of the transfer conveyor are created due to the ability of the rocker to be swiveled by the weight of the unit load itself while being transported on the transport conveyor.

8 Claims, 5 Drawing Sheets

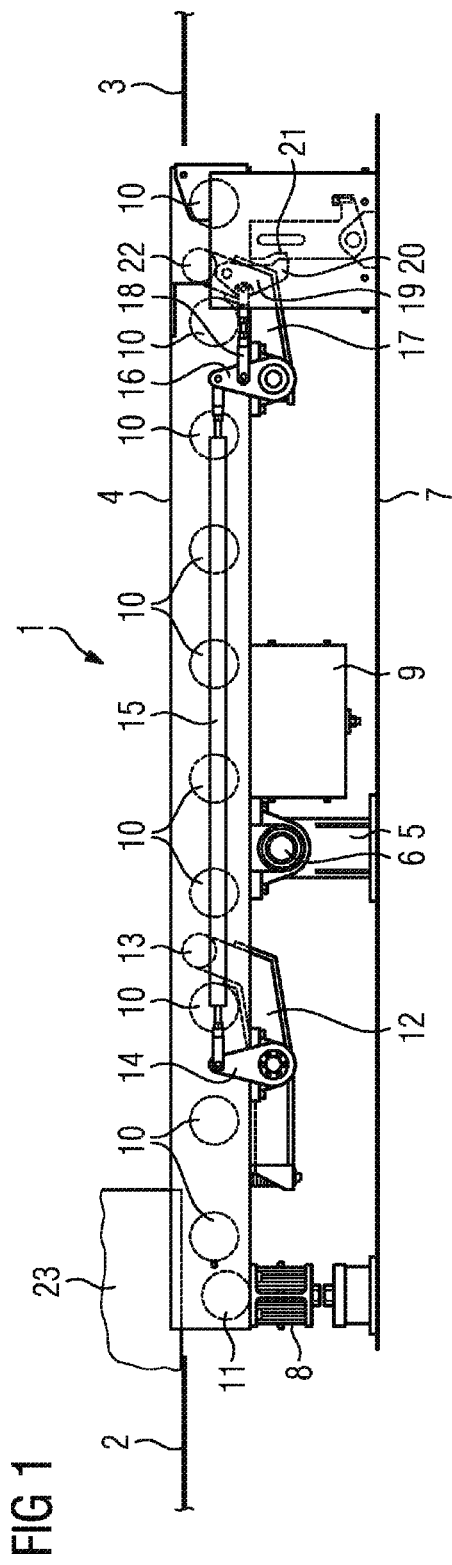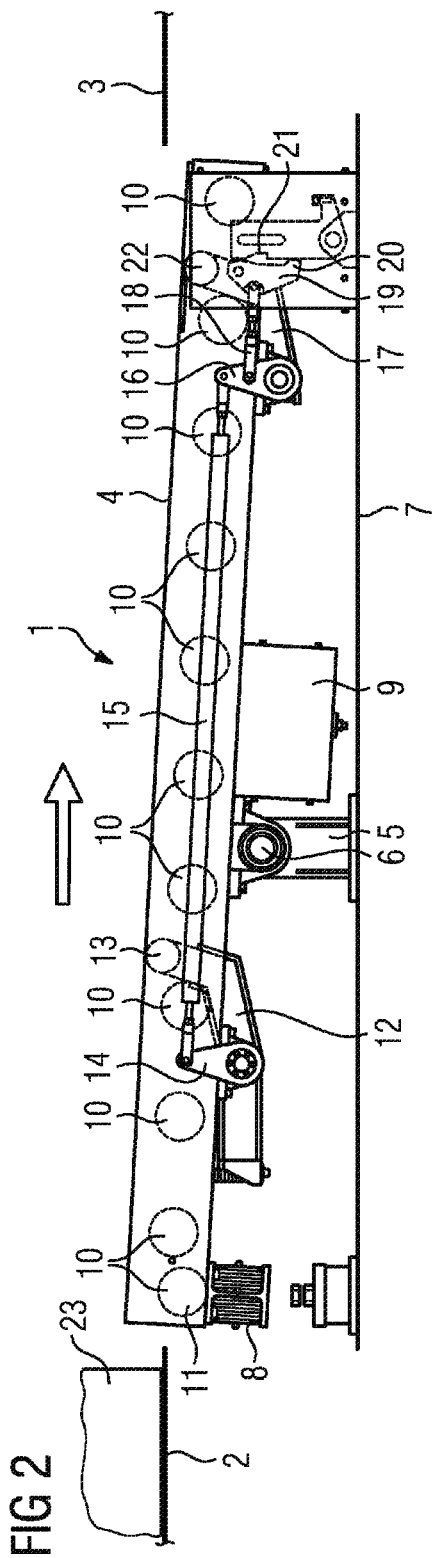

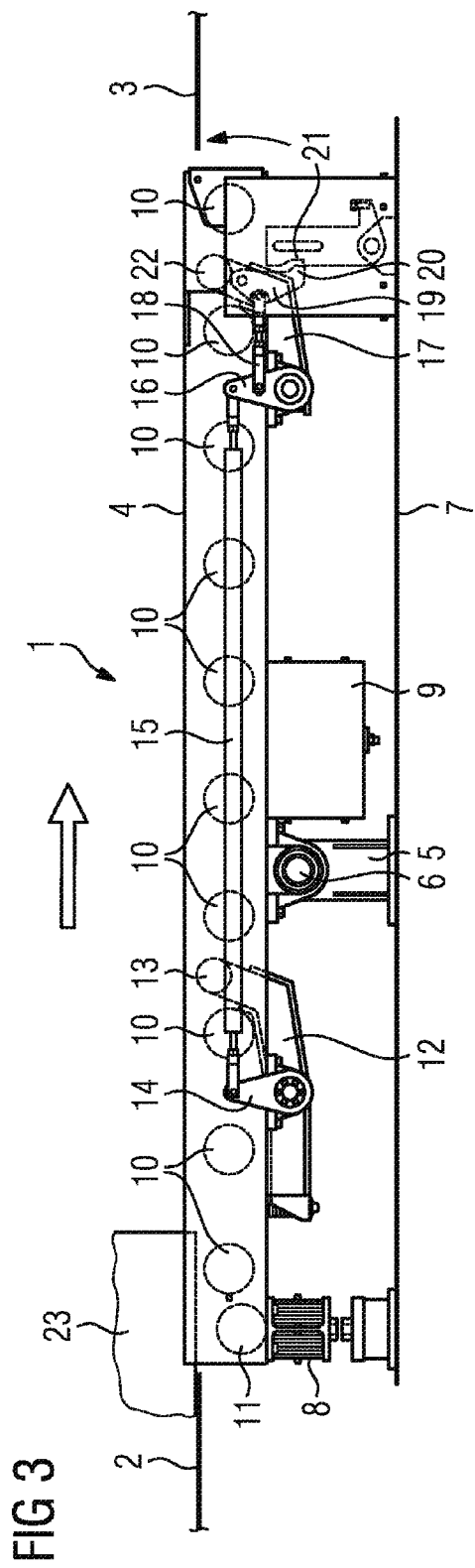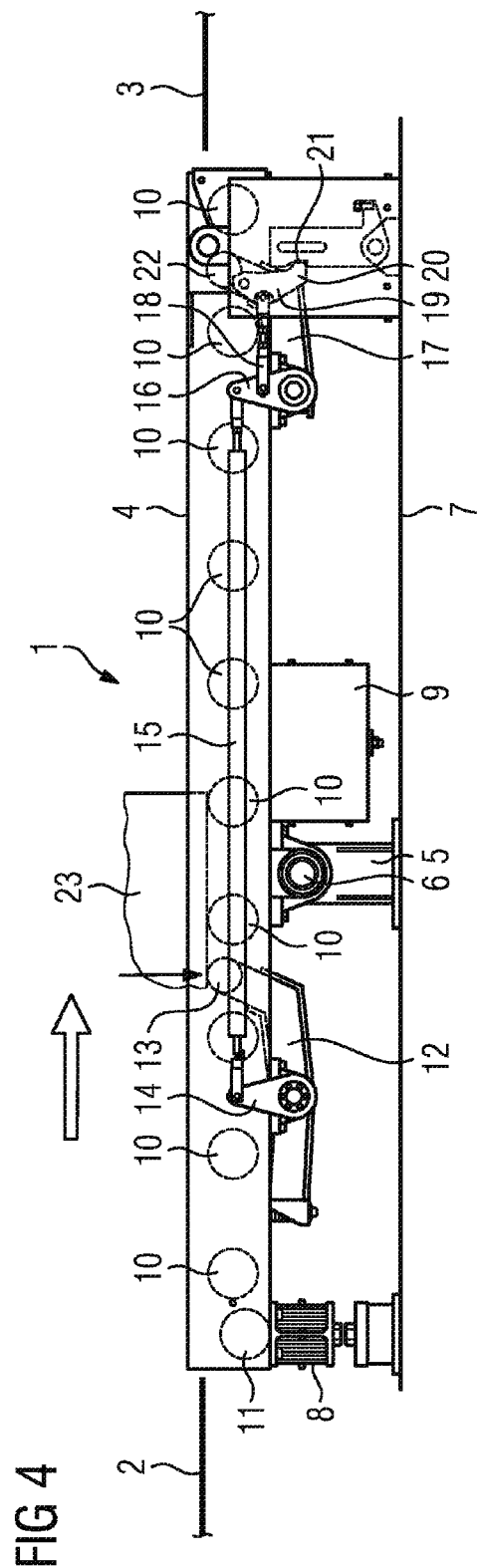

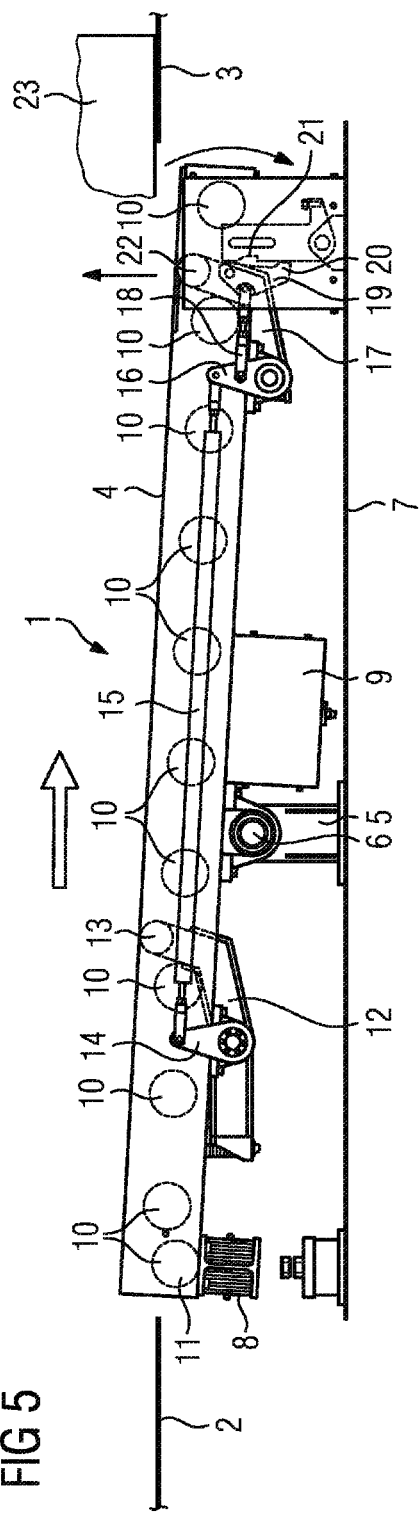
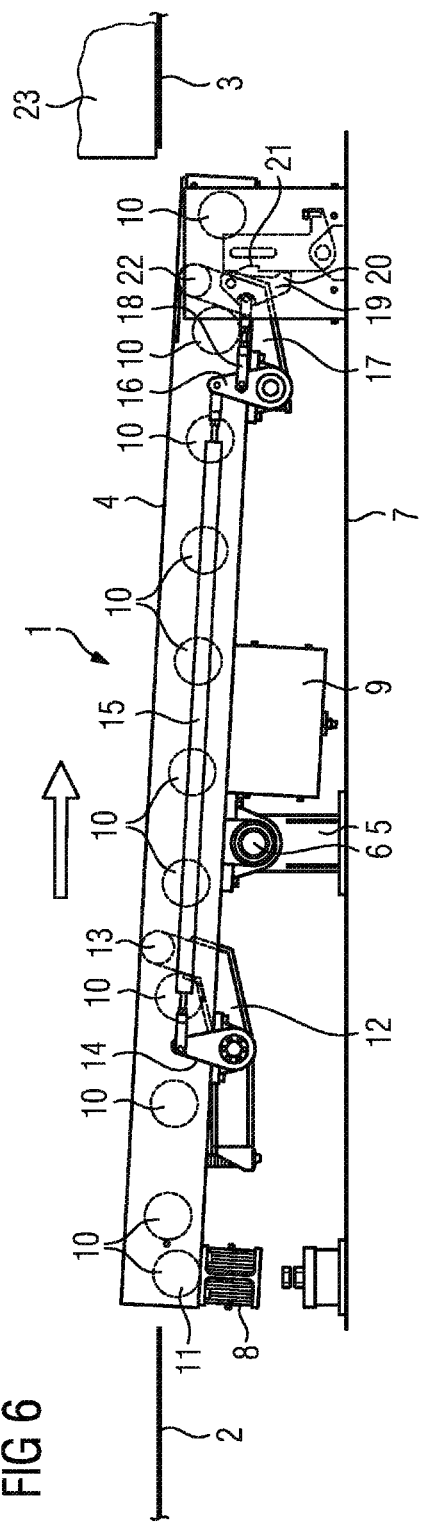

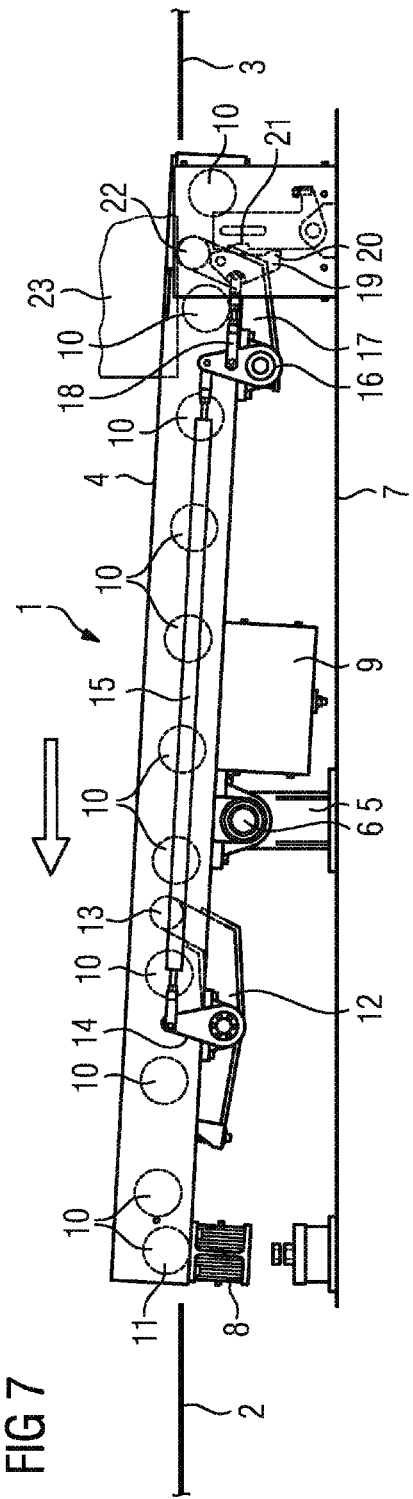
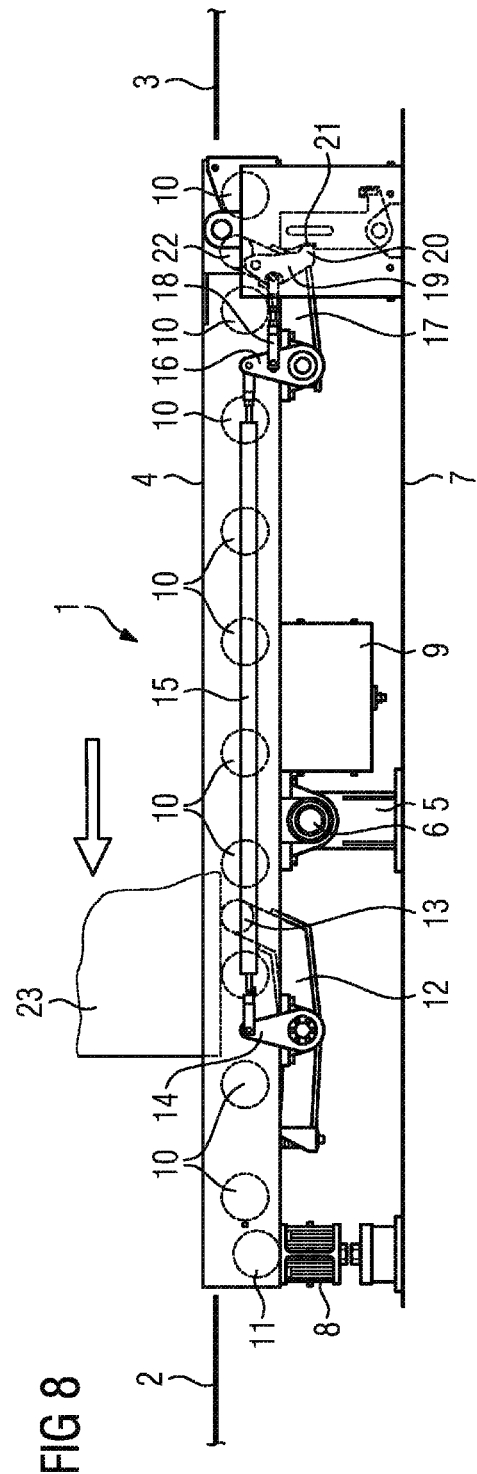

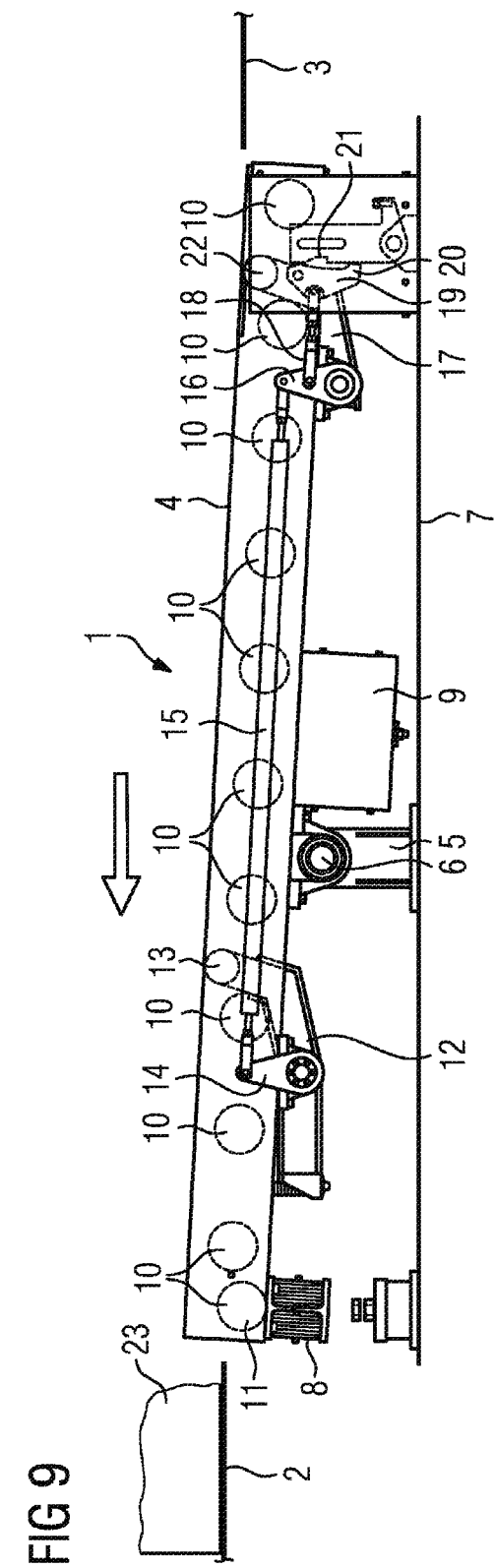

TRANSFER CONVEYOR FOR TRANSPORTING STANDARDIZED LOADING UNITS

BACKGROUND OF THE INVENTION

Field of the Invention

The invention relates to a transfer conveyor for transporting standardized unit loads, such as freight containers, pallets or the like, from a first height level to a second height level, in particular from a relatively high storage location to a relatively low transporting means, wherein the transfer conveyor is part of a rocker, the inclination of which about a pivoting axis provided in the central region of the rocker with respect to the longitudinal extent of the transfer conveyor, can be adjusted from a position in which one end of the rocker is aligned with one of the height levels into a second position in which the other end of the rocker is aligned with the other height level.

Transfer conveyors of this type are used, for example, to transfer loads, such as standardized containers or pallets, from an intermediate store to the loading surface of a transportation vehicle (dolly) which is substantially at the same height level, during cargo operations. In this context, the problem arises that the two height levels are frequently not in the aimed-at same plane because they differ due to variations at the transportation vehicle. It is therefore possible for a worn tire to cause a difference in height of a few centimeters, resulting in the edge of the unit load impacting against the transfer conveyor and making transfer possible only if the unit load, which is frequently several tonnes in weight, is pushed over this difference in height.

Hitherto, the problem has been solved by virtue of the fact that the rocker of the transfer conveyor was raised to the correct level on one side, specifically using powerful spindle drives which are suitable to raise even very heavy loads. This enabled the unit loads to be moved into a conveying plane which permitted transportation up to and onto the transportation vehicle by means of the transporting rollers of the transfer conveyor.

It was possible to adapt the rocking position of the rocker to the current difference in height.

However, the heavy spindle drives or other actuators which have been used are complex and costly due to the maintenance measures which are necessary and the energy costs.

BRIEF SUMMARY OF THE INVENTION

The object of the present invention is to provide an effective and cost-efficient transfer conveyor of the generic type which overcomes the differences in height between the two height levels equally efficiently but with little need for maintenance and in an energy-saving fashion without the costly mechanical drives of the rocker.

In order to achieve the object, the invention provides that the rocker can be pivoted under the weight of the unit load which is transported on the transfer conveyor. The kinematics of the rocker as part of the transfer conveyor have been skillfully modified in such a way that it is possible to completely dispense with an extraneous drive of the rocker. Instead, the unit load's own weight is used to move the rocker about its pivoting axis and to place the two ends of the transfer conveyor successively at the differing height levels.

According to the invention, the transfer conveyor is a roller conveyor, between the driven transporting rollers of which individual triggering rollers, which are mounted underneath the conveying plane of the transfer conveyor and can be pivoted upward out of said plane, are provided for the kinematics of the rocker, which triggering rollers can be activated by the unit load when said unit load is transported over the transfer conveyor. These triggering rollers are part of the rocking kinematics which are triggered by the unit load and are essential for permitting the functional pivoting of the rocker with the unit load.

According to one important feature of the invention there is provision that the rocker can be secured temporarily in a horizontal position of the transfer conveyor under the control of the triggering rollers. The securing of the rocker in the horizontal ensures that the necessary height position for transferring the unit load to the transportation vehicle is maintained even if the loading surface of said transportation vehicle is situated at a lower location than the bearing surface.

According to the invention, in the home position of the rocker one of the ends of the transfer conveyor is preferably aligned with the plane of the relatively low height level, and at the other end of the transfer conveyor at least the first transporting roller thereof is arranged underneath the support plane of the unit load. This refinement permits transfer of the unit load to the transfer conveyor, and initially onto the first transporting roller. The unit load presses downward the part of the rocker facing it.

According to another feature of the invention, at least one of the triggering rollers is positioned adjacent to the at least first transporting roller and above the conveying plane of the transfer conveyor, which at least one triggering roller is pressed downward during the transportation of the unit load over the transporting rollers of the transfer conveyor, and triggers a catch which, by latching into a stationary counter-bearing, secures the rocker and therefore the transfer conveyor in the horizontal as long as the unit load is located on the transfer conveyor. The catch is part of a lever which is activated by the triggering roller, preferably by means of a linkage, and which is triggered as soon as the triggering roller is depressed by the unit load resting on it.

At least a second triggering roller of the same type is arranged in the region of the opposite end of the rocker between the transporting rollers, which second triggering roller is operatively connected to the first triggering roller and/or the catch and is held underneath the conveying plane of the transfer conveyor by the unit load resting thereon, until the outer edge of said unit load releases the triggering roller and therefore the catch in the counterbearing, with the result that the transfer conveyor can be moved back into its home position.

This second triggering roller, which is preferably connected to the first triggering roller via a linkage, is held down by the unit load transported by means of the transfer conveyor even if the rear edge of said unit load has already exited the first triggering roller. Since both rollers are operatively connected to one another, the catch remains in the locked position in the counterbearing until the unit load has left the transfer conveyor. Only when the rear edge of the unit load has released the second triggering roller can the catch move back and release the rocker, with the result that said rocker pivots back into its home position. However, the greater part of the unit load is then already located on the loading surface of the transportation vehicle.

In order to transfer a unit load from, for example, the transportation vehicle to a storage location, that is to say to transport it in the reverse direction, the invention provides that when a unit load is transported from the low height level to the other height level, the unit load which is to be transported is firstly transferred to the transfer conveyor at the same level, wherein the unit load moves the second triggering roller, and the first triggering roller connected thereto, under the transporting plane of the transfer conveyor and as a result places the catch, which is operatively connected thereto, in a standby position. In this position, the catch cannot yet latch into the counterbearing because in the home position of the rocker the region of the transfer conveyor which faces the unit load is situated at a lower location, and the catch does not reach the cutout in the counterbearing.

According to the invention, only when the unit load is transported over the pivoting axis of the rocker does the rocker tilt into the horizontal where the catch moves out of its standby position into the counterbearing. The rocker is locked while at the same time the first triggering roller is held down by the unit load.

After the transfer conveyor has exited and the first and second triggering rollers have become free of the unit load, the triggering rollers can move back into their home positions above the transporting plane. The rocker pivots back into its home position after the catch is released.

The proposed design of the transfer conveyor is capable of transferring unit loads without an extraneous drive even if the starting level and the end level are not in a common plane. The solution which is arrived at is surprisingly simple and functionally reliable.

An exemplary embodiment of the invention is illustrated in the drawing and will be described below. In said drawing:

BRIEF DESCRIPTION OF THE SEVERAL VIEWS OF THE DRAWING

FIG. 1 is a schematic side view of the transfer conveyor according to the invention, FIGS. 2-5 show the transportation of a container from a storage location to a transporting means in four steps, and FIGS. 6 to 9 show the transportation of a container from the transporting means to the storage location in four steps.

DESCRIPTION OF THE INVENTION

In FIG. 1, the entirety of the transfer conveyor of the invention, arranged between a storage location 2 and a transporting means 3 (dolly), is denoted by 1. The transfer conveyor is part of a rocker 4 which is supported on the plane 7 at 5. The rocker is largely balanced by means of an equalizing weight 8, on the underside of which an end stop for the rocker 4 is provided on the plane 7. The transfer conveyor itself is formed by the driven transporting rollers 10 which are rotatably mounted in the rocker 4 and are driven in rotation in both directions by means of a central drive indicated at 9. The first transporting roller 11 on the transporting location 2 side is arranged underneath the transporting plane of the transporting rollers 10, in order to be able to transfer a container 23, as will also be described later.

A pivoting lever 12, which is fitted at its free end with the triggering roller 13 which, in one pivoted position between two transporting rollers 10, projects out in an upward direction out of the transporting plane of the transporting rollers, is mounted underneath the rocker 4. In a second pivoted position of the lever 12, the triggering roller 13 dips downward under the transporting plane which is formed by the transporting rollers 10. A further lever 14, which is pivoted together with the lever 12 as soon as the pivoting lever 12 is moved, is arranged on the pivoting axis of the lever 12. The lever 14 is connected to a further lever 16 on the opposite side of the rocker via a coupling rod 15, which further lever 16 is itself arranged on the pivoting lever 17, at the free end of which the second triggering roller 22 is arranged. This second triggering roller 22 can also be pivoted out of a position below the transporting plane of the transfer conveyor into a position above the transporting plane in which the triggering roller 22 projects out in an upward direction between two transporting rollers 10. A coupling rod, which is preferably sprung in its longitudinal direction is connected to the lever 16 and is coupled at its other free end to a catch 19 which can be latched by its nose 20 into a cutout on the counterbearing 21. The counterbearing 21 is supported statically on the plane 7, and the rocker 4 can be adjusted together with the catch 19 about the pivoting axis 6. The pivoting travel of the rocker 4 is relatively small, matched to the customary differences in height, but constitutes an infinitely variable transition between the storage plane and the plane of the transportation vehicle.

The method of the function of the invention is illustrated in individual steps in FIGS. 2 to 9 and described below. Identical parts are denoted identically. In FIG. 1, a container which rests on the storage location 2 is indicated at 23. This container 23 is intended to be transferred onto the loading platform of the transporting means 3, referred to as a dolly, which is moved forward onto the opposite side of the rocker 4 (FIG. 5). FIG. 2 illustrates the home position of the rocker in which the part of the rocker 4 on the right hand (viewed in the plane of the drawing) is situated at a lower location than the left-hand part. As is apparent from FIG. 3, the container 23 has been guided by its front edge onto the first transporting roller 11 and has pushed the latter downward to such an extent that the second transporting roller 10 comes to rest under the container 23. In the process, the transfer conveyor was pushed with the rocker 4 into a horizontal position, with the result that the container 23 can be transported on in the direction of the arrow. As soon as the leading edge of the container 23 has reached the triggering roller 13, the container 23 pushes said triggering roller downward, together with the lever 12, below the transporting plane of the transporting rollers 10. As a result of this pivoting movement of the lever 12, the catch 19 is pressed into the cutout in the counterbearing 21 via the coupling rod 15 coupled to the lever 14 and via the lever 16 and the coupling rod 18, with the result that the rocker 4 is secured in the horizontal position. This position is illustrated in FIG. 4. It is also apparent in FIG. 4 that half of the container 23 is already resting on the transfer conveyor or the rocker 4. This ensures that the rocker retains its relatively high position on the right (viewed in the drawing), in which position the transporting plane of the transporting rollers 10 is located above the loading plane of the transporting means. In this position, the container 23 can, as illustrated in FIG. 5, be transferred onto the transporting means 3. Although the rear edge of the container 23 has already exited the triggering roller 13, as a result of the fact that the triggering roller 13 is connected to the levers 16 and 17 via the levers 12 and 14 and the coupling rod 15, it is ensured that the catch, which is indirectly connected to the lever 16, remains in the counterbearing 21 for as long as part of the container presses the triggering roller 22 downward. Only if the container 23 has exited the triggering roller 22 is the catch 19 released and the transfer conveyor moves back with the rocker 4 into the home position which is illustrated in FIG. 2.

If it is intended to transfer a container 23 from the loading surface of the transportation vehicle 3 to the storage location, the transfer conveyor or the rocker 4 is already in the correct home position, specifically below the height level of the loading surface (FIG. 6). As indicated in FIG. 7, as the container 23 has progressed in the transporting direction according to the arrow it has reached the triggering roller 22 and pressed the latter downward under the transporting plane of the transporting rollers 10. In the process, the catch 19 was pressed in the direction of the counterbearing by means of the lever 17 and the lever 16 attached thereto, as well as the coupling rod 18, but due to the different height positions said catch 19 cannot yet latch with the nose 20 into the counterbearing 21. Nevertheless, a spring integrated into the coupling rod 18 causes the catch 19 to be pressed against the counterbearing 21.

FIG. 8 illustrates a position of the container 23 in which the latter has already been conveyed over the pivoting point 6 of the rocker 4. The rocker 4 tilts about the pivoting point with the transfer conveyor into the horizontal and in doing so at the same time causes the catch 19 to latch into the counterbearing 21 because, owing to the held-down triggering roller 13, a pressure acting on the catch 19 in the direction of the counterbearing 21 is built up via the coupling rod 18. The transfer conveyor and/or the rocker 4 is/are secured in the horizontal when the catch 19 is latched in, with the result that the container 23 can be transported on in the direction of the bearing point 2. On its way in the direction of the arrow, the container reaches, as can already be seen in FIG. 8, the first triggering roller 13 which is held down owing to the coupled connection to the lever 16 via the coupling rod 15, and owing to the kinematics of the levers 12 and 14. As a result, the triggering roller 13 is also held below the transporting plane if the rear edge of the container 23 has also already released the second triggering roller 22. Only if the rear edge of the container 23 has released the triggering roller 13 and the major part of the container has arrived at the storage point 2, is the catch 19 released from the counterbearing 21, with the result that the rocker 4 and therefore the transfer conveyor fall back into the home position in FIG. 1 and are ready for a further transporting operation.

The invention claimed is:

1. A transfer device for transporting standardized unit loads, including freight containers or pallets, from a first height level to a second height level or from a relatively high storage location to a relatively low transporting device, the transfer device comprising:
    a rocker having two ends, a central region with a pivoting axis and a transfer conveyor with a longitudinal extent and ends;
    said rocker configured to pivot about said pivoting axis relative to said longitudinal extent of said transfer conveyor, under a weight of the unit load transported on said transfer conveyor, with an adjustable inclination from a first position having one end of said rocker aligned with one of the height levels into a second position having another end of the rocker aligned with the other of the height levels; and
    said rocker having a home position in which one of said ends of said transfer conveyor is aligned with a plane of a relatively low height level and at another of said ends of said transfer conveyor at least a first one of said transporting rollers is disposed underneath a support plane of the unit load.

2. The transfer device according to claim 1, wherein said transfer conveyor is a roller conveyor defining a conveying plane and having driven transporting rollers and individual triggering rollers, said triggering rollers being mounted between said transporting rollers underneath said conveying plane and configured to be pivoted upward out of said conveying plane for kinematics of said rocker, and said triggering rollers configured to be activated by the unit load when the unit load is transported over said transfer conveyor.

3. The transfer device according to claim 2, wherein said rocker is configured to be secured temporarily in a horizontal position of said transfer conveyor under control of said triggering rollers.

4. The transfer device according to claim 2, which further comprises:
    a stationary counterbearing; and
    a catch;
    at least one first triggering roller being positioned adjacent at least a first one of said transporting rollers and above said conveying plane of said transfer conveyor;
    said at least one first said triggering roller being pressed downward during transportation of the unit load over said transporting rollers of said transfer conveyor, and triggering said catch to latch into said stationary counterbearing and secure said rocker and therefore said transfer conveyor in a horizontal position as long as the unit load is located on said transfer conveyor.

5. The transfer device according to claim 4, wherein at least one second triggering roller similar to said at least one first triggering roller is disposed in a region of said other end of said rocker between said transporting rollers, said at least one second triggering roller being operatively connected to at least one of said at least one first triggering roller or said catch and held underneath said conveying plane of said transfer conveyor by the unit load resting thereon, until an outer edge of said unit load releases one of said triggering rollers and therefore said catch in said counterbearing, resulting in said transfer conveyor being movable back into said home position.

6. The transfer device according to claim 5, wherein upon a unit load being transported from a relatively low height level to another height level, the unit load to be transported being firstly transferred to said transfer conveyor at the same level, the unit load moving said at least one second triggering roller, and said at least one first triggering roller connected thereto, under said transporting plane of said transfer conveyor and as a result placing said catch, being operatively connected thereto, in a standby position.

7. The transfer device according to claim 6, wherein said rocker tilts into a horizontal position upon the unit load being transported over said pivoting axis of said rocker, and in said horizontal position said catch moving out of said standby position and into said counterbearing and locking said rocker and simultaneously holding down said at least one first triggering roller by the unit load.

8. The transfer device according to claim 7, wherein after the unit load leaves said transfer conveyor and said at least one first and said at least one second triggering rollers have become free of the unit load, said triggering rollers being movable back into home positions above said transporting plane and said rocker pivoting back into said home position resulting in said catch being released.

* * * * *